United States Patent
Yun

(10) Patent No.: US 9,160,944 B2
(45) Date of Patent: Oct. 13, 2015

(54) SIGNAL PROCESSING APPARATUS AND METHOD FOR REDUCING NOISE

(71) Applicant: SK hynix Inc., Gyeonggi-do (KR)

(72) Inventor: Young-Hwan Yun, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 62 days.

(21) Appl. No.: 14/067,339

(22) Filed: Oct. 30, 2013

(65) Prior Publication Data

US 2015/0077595 A1     Mar. 19, 2015

(30) Foreign Application Priority Data

Sep. 13, 2013    (KR) .................. 10-2013-0110408

(51) Int. Cl.
*H04N 5/357* (2011.01)
*H04N 5/378* (2011.01)
*H04N 5/235* (2006.01)

(52) U.S. Cl.
CPC ............... *H04N 5/357* (2013.01); *H04N 5/235* (2013.01); *H04N 5/378* (2013.01)

(58) Field of Classification Search
CPC ..... H04N 5/357; H04N 5/3575; H04N 5/361; H04N 5/378; H04N 5/235
See application file for complete search history.

(56) References Cited

U.S. PATENT DOCUMENTS

| | | | | |
|---|---|---|---|---|
| 6,040,860 A * | 3/2000 | Tamura et al. | ................ | 348/252 |
| 6,148,103 A * | 11/2000 | Nenonen | ................ | 382/169 |
| 8,237,688 B2 * | 8/2012 | Huang et al. | ................ | 345/204 |
| 2005/0248670 A1 * | 11/2005 | Jung | ................ | 348/242 |
| 2006/0078222 A1 * | 4/2006 | Hwang | ................ | 382/274 |
| 2006/0221214 A1 * | 10/2006 | Yanof et al. | ................ | 348/246 |
| 2006/0238629 A1 * | 10/2006 | Sato et al. | ................ | 348/241 |
| 2007/0165947 A1 * | 7/2007 | Paik | ................ | 382/169 |
| 2007/0223041 A1 * | 9/2007 | Hsieh et al. | ................ | 358/3.01 |
| 2007/0223814 A1 * | 9/2007 | Chang et al. | ................ | 382/169 |
| 2008/0002907 A1 * | 1/2008 | Xu et al. | ................ | 382/274 |
| 2008/0024673 A1 * | 1/2008 | Cha | ................ | 348/678 |
| 2008/0055681 A1 * | 3/2008 | Li | ................ | 358/520 |
| 2008/0101697 A1 * | 5/2008 | Cho et al. | ................ | 382/169 |
| 2008/0187235 A1 * | 8/2008 | Wakazono et al. | ................ | 382/255 |
| 2008/0199074 A1 * | 8/2008 | Mitsunaga | ................ | 382/169 |
| 2009/0207284 A1 * | 8/2009 | Johnson | ................ | 348/241 |
| 2011/0007188 A1 * | 1/2011 | Manabe | ................ | 348/240.2 |
| 2011/0051008 A1 * | 3/2011 | Lee et al. | ................ | 348/678 |
| 2011/0069209 A1 * | 3/2011 | Kanemitsu et al. | ................ | 348/246 |
| 2011/0085086 A1 * | 4/2011 | Shi et al. | ................ | 348/624 |
| 2011/0249890 A1 * | 10/2011 | Kim et al. | ................ | 382/162 |
| 2012/0288194 A1 * | 11/2012 | Nakamura et al. | ................ | 382/167 |
| 2013/0107083 A1 * | 5/2013 | Hsu | ................ | 348/242 |
| 2013/0148890 A1 * | 6/2013 | Kim | ................ | 382/167 |

FOREIGN PATENT DOCUMENTS

| KR | 1020060117025 | 11/2006 |
|---|---|---|
| KR | 1020070099238 | 10/2007 |

* cited by examiner

*Primary Examiner* — Roberto Velez
*Assistant Examiner* — Abdelaaziz Tissire
(74) *Attorney, Agent, or Firm* — IP & T Group LLP

(57) ABSTRACT

A signal processing apparatus may comprise: a pixel array where a plurality of pixels for storing data values are arranged; and a noise removing unit suitable for reflecting a data value of an adjacent pixel that is adjacent to a selected pixel, and a gain value depending on a data value of the selected pixel, on the data value of the selected pixel, and outputting the reflected data value of the selected pixel.

12 Claims, 3 Drawing Sheets

SIGNAL PROCESSING APPARATUS AND METHOD FOR REDUCING NOISE

CROSS-REFERENCE TO RELATED APPLICATIONS

The present application claims priority of Korean Patent Application No. 10-2013-0110408, filed on Sep. 13, 2013, which is incorporated herein by reference in its entirety.

BACKGROUND

1. Field

Exemplary embodiments of the present invention relate to a signal processing technique and more particularly, to a signal processing apparatus and a signal processing method.

2. Description of the Related Art

Image sensors sense lights and convert brightness of the lights to digital image data. A complementary metal oxide semiconductor image sensor (CIS) is one of the image sensors nowadays. Needs for a digital image processing apparatus using the CIS rapidly increase and thus functions of the digital image processing apparatus are being developed day by day. Despite the development, it is difficult to store an image of a subject as it is. According to a current status of technology, an image is stored through sampling of representative value of the subject. Recently, research is progressing in order to obtain image information as close as the subject possible.

When taking a picture of a subject having both of a bright region and a dark region, it is hard to obtain a fine image of the subject with an excellent view of both the bright region and the dark region in spite of optimal time of exposure and optimal adjustment of aperture. A wide dynamic range (WDR) technique is one of solutions to those concerns. The WDR technique is classified into a 'multiple sampling method' and a 'well capacity adjusting method'. The multiple sampling method has an advantage of an excellent combination quality and a disadvantage of need for a frame memory or a plurality of line memories due to a combination of a plurality of images with time difference. The well capacity adjusting method has disadvantages of nonlinearity and image composition due to large distribution between unit pixels. In short, the WDR technique causes an unintended noise with an obtained image.

SUMMARY

Various exemplary Embodiments of the present invention are directed to a signal processing apparatus and method capable of removing a noise included in an image signal.

In accordance with an exemplary embodiment of the present invention, a signal processing apparatus may comprise: a pixel array where a plurality of pixels for storing data values are arranged; and a noise removing unit suitable for reflecting a data value of an adjacent pixel that is adjacent to a selected pixel, and a gain value depending on a data value of the selected pixel, on the data value of the selected pixel, and outputting the reflected data value of the selected pixel.

In accordance with an exemplary embodiment of the present invention, a signal processing apparatus may comprise: a pixel array where a plurality of pixels for storing data values are arranged; an image processor suitable for processing a data value of a selected pixel from the plurality of pixels; and a gain reflector suitable for reflecting a predetermined gain value on a signal output from the image processor, and outputting the reflected signal.

In accordance with an exemplary embodiment of the present invention, a signal processing method may comprise: processing an image of a pixel array where a plurality of pixels for storing data values are arranged; determining whether the processed image is bright or dark; adjusting a graph based on the determination result; and reflecting a gain value of the adjusted graph on the processed image.

The signal processing apparatus and method in accordance with exemplary embodiments of the present invention may remove a noise included in an image signal of a selected pixel by reflecting a data value of an adjacent pixel, which is adjacent to the selected pixel, and a gain value according to a data value of the selected pixel, in the value of the selected pixel, thereby obtaining more stable image signal.

DETAILED DESCRIPTION

Figure 1:
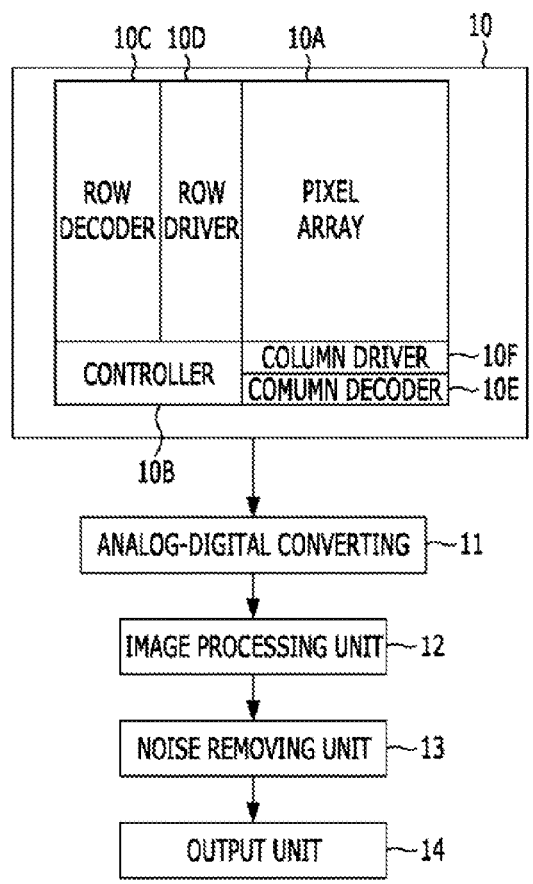
FIG. 1 is a block diagram illustrating a signal processing apparatus in accordance with an exemplary embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete and will fully convey the scope of the present invention to those skilled in the art. Throughout the disclosure, reference numerals correspond directly to the like parts in the various figures and embodiments of the present invention. It is also noted that in this specification, "connected/coupled" refers to one component not only directly coupling another component but also indirectly coupling another component through an intermediate component. In addition, a singular form may include a plural form as long as it is not specifically mentioned in a sentence.

The drawings are not necessarily to scale and in some instances, proportions may have been exaggerated in order to clearly illustrate features of the embodiments.

FIG. 1 is a block diagram illustrating a signal processing apparatus in accordance with an embodiment of the present invention.

Referring to FIG. 1, the signal processing apparatus may include a core region 10 where an analogue value is stored. The core region 10 may include a pixel array 10A, a controller 10B, a row decoder 10C, a row driver 10D, a column decoder 10E, and a column driver 10F.

The pixel array 10A may include a plurality of pixels in a two dimensional (2D) matrix arranged by a plurality of row lines and a plurality of column lines. The plurality of pixels include a red pixel for converting a light of a red spectrum range into an electrical signal, a green pixel for converting a light of a green spectrum range into an electrical signal, and a blue pixel for converting a light of a blue spectrum range into an electrical signal. The pixel array 10A may include a color filter for filtering each light of the red, green and blue spectrum ranges.

The controller 10B may control overall operations of the signal processing apparatus, especially the row decoder 10C, the row driver 10D, the column decoder 10E, and the column driver 10F. The row decoder 10C may decode an address signal (not shown) and generate a row selection signal for selecting one of the plurality of row lines of the pixel array 10A. The row driver 10D may activate one of the row lines in response to the row selection signal. The column decoder 10E may decode an address signal (not shown) and generate a column selection signal for selecting one of the plurality of column lines of the pixel array 10A. The column driver 10F may activate one of the column lines in response to the column selection signal.

As described above, the analogue value stored in the pixel array 10A may be output by selecting the corresponding row line and column line.

The signal processing apparatus may further include an analogue-digital converting unit 11, an image processing unit 12, a noise removing unit 13, and an output unit 14.

The analogue-digital converting unit 11 may digitize a signal of the analogue value output from the core region 10 to output a digital signal. The image processing unit 12 may perform a digital image processing operation on the digital signal output from the analogue-digital converting unit 11.

The noise removing unit 13 may remove a noise from a signal output from the image processing unit 12. The output unit 14 may output a signal from the noise removing unit 13. The noise removing unit 13 may remove the noise by reflecting a data value of an adjacent pixel that is adjacent to a selected pixel from the plurality of pixels, and a gain value according to a data value of the selected pixel, on the data value of the selected pixel.

The signal processing apparatus in accordance with the exemplary embodiment of the present invention may include the noise removing unit 13. The noise removing unit 13 may remove a noise that may be generated in the course of processing data values stored in the pixel array 10A.

Figure 2:
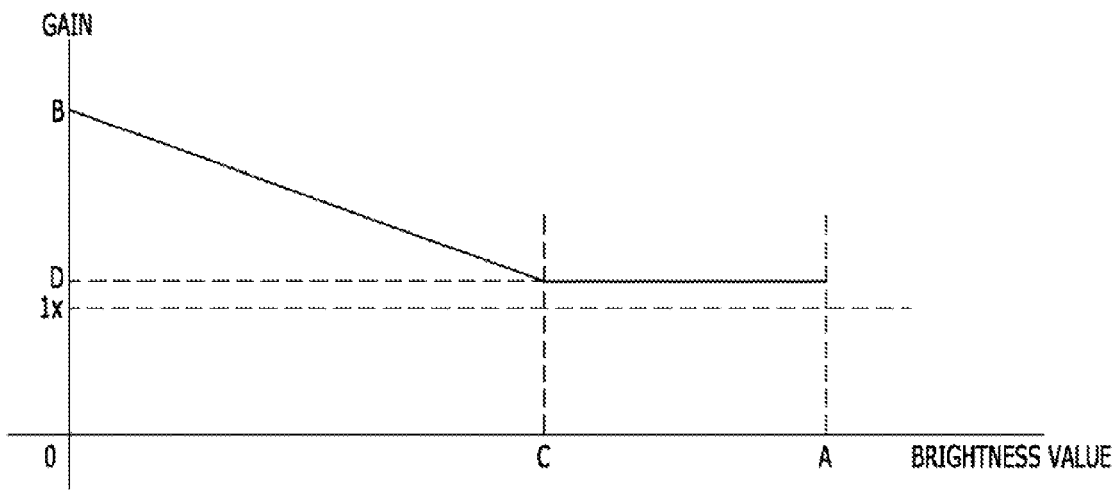
FIGS. 2 and 3 are gain-brightness graphs illustrating a noise removing unit of the signal processing apparatus shown in FIG. 1.

FIG. 2 is a gain-brightness graph illustrating the noise removing unit 13 of the signal processing apparatus shown in FIG. 1.

Referring to FIG. 2, an X-axis may denote a data value of a pixel such as a brightness value, and a Y-axis may denote a gain value according to the brightness value. Reference numeral 'A' on the X-axis may denote the maximum of the brightness value. (Hereinafter, referring to as a 'maximum brightness value'.) Reference numeral 'B' on the Y-axis may denote the maximum of the gain value. Reference numeral 'C' on the X-axis may denote the minimum of the brightness value corresponding to a minimum gain. Reference numeral 'D' on the Y-axis may denote the minimum value of the Y-axis. As shown in FIG. 2, the brightness value may be in an inverse proportion to the gain value. The reference numeral 'A' on the X-axis may cover a convergence range of the brightness value. In short, FIG. 2 may be a graph showing the gain value according to the brightness value of a pixel.

As described above, the noise removing unit 13 may reflect a data value of an adjacent pixel that is adjacent to a selected pixel from the plurality of pixels, and a gain value according to a data value of the selected pixel, on the data value of the selected pixel, and thus a noise included in the data value of the selected pixel may be removed. FIG. 2 illustrates the gain value according to the data value of the selected pixel, i.e., the gain value according to the brightness value of the selected pixel. Described below through equations is the data value of the adjacent pixel adjacent to the selected pixel as well as the gain value according to the data value of the selected pixel shown in FIG. 2.

Equation 1 below shows a relationship between a selected pixel and an adjacent pixel adjacent to the selected pixel.

$$p1'=((p1+p2)/2)*(((D-B)/C)*p1+B),\qquad \text{[EQUATION 1]}$$

where p1 denotes a data value of the selected pixel before removing a noise, p1' denotes a data value of the selected pixel after removing the noise, p2 denotes a data value of the adjacent pixel, B denotes a maximum gain value of the selected pixel, C denotes the maximum value of the X-axis, D denotes the minimum value of the Y-axis.

As can be seen from equation 1, the noise removing unit 13 may reflect an average of the data values of the adjacent pixel and the selected pixel, and a gain value according to the data value of the selected pixel, i.e., the brightness value of the selected pixel, on the data value of the selected pixel according to the gain-brightness graph shown in FIG. 2.

Equation 2 below shows a relationship between a selected pixel and two adjacent pixels adjacent to the selected pixel.

$$p1'=((p1+p2+p3)/3)*(((D-B)/C)*p1+B),\qquad \text{[EQUATION 2]}$$

where p2 and p3 denote data values of the adjacent pixels.

As can be seen from equation 2, the noise removing unit 13 may reflect an average of the data values of the adjacent pixels and the selected pixel, and a gain value according to the brightness value of the selected pixel, on the data value of the selected pixel.

Equation 3 below shows a relationship between a selected pixel and three adjacent pixels adjacent to the selected pixel.

$$p1'=((p1+p2+p3+p4)/4)*(((D-B)/C)*p1+B),\qquad \text{[EQUATION 3]}$$

where p2, p3 and p4 denote data values of the adjacent pixels.

As can be seen from equation 3, the noise removing unit 13 may reflect an average of the data values of the adjacent pixels and the selected pixel, and a gain value according to the brightness value of the selected pixel, on the data value of the selected pixel.

Figure 3:
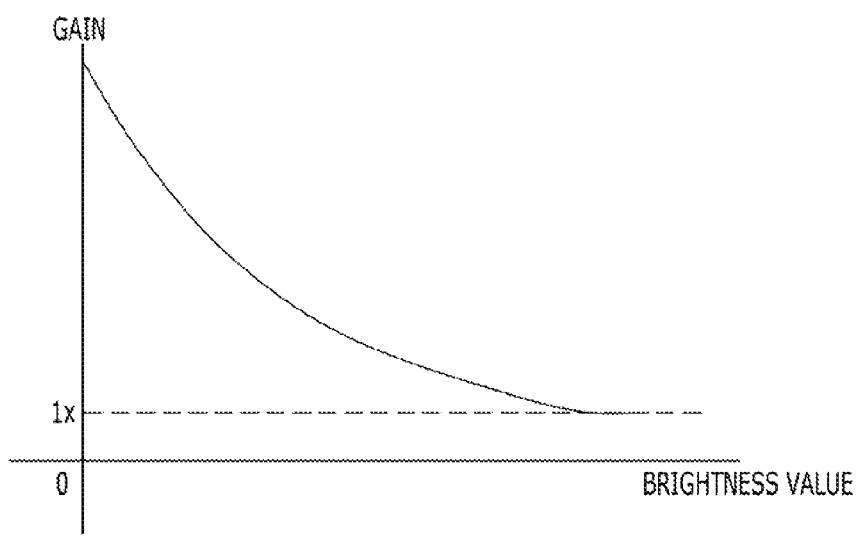

Meanwhile, an inverse proportional relationship between the brightness value and the gain value may have various types, FIG. 3 may be one of which.

FIG. 3 is a gain-brightness graph illustrating the noise removing unit 13 of the signal processing apparatus shown in FIG. 1.

As shown in FIG. 3, the brightness value may be in an inverse proportion to the gain value. A noise may not occur in case of a continuous function such as the gain-brightness graph shown in FIG. 3, which is different from the gain-brightness graph shown in FIG. 2 in which a noise at 'C' on the X-axis may occur. That is, the noise at 'C' of FIG. 2 may occur due to a rapid change.

The noise removing unit 13 in accordance with the exemplary embodiment of the present invention may remove a noise by equations described above. Even though the equations show three adjacent pixels as examples, the present invention may cover cases of four or more adjacent pixels.

Figure 4:
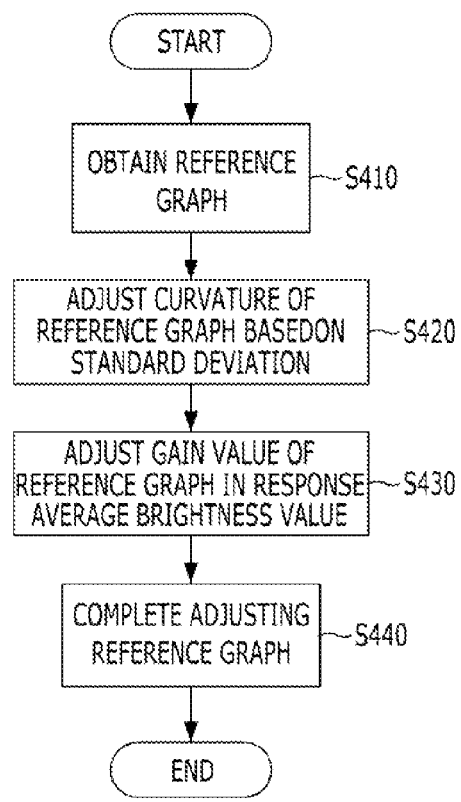
FIG. 4 is a flow chart illustrating a method of adjusting the gain-brightness graphs shown in FIGS. 2 and 3.

FIG. 4 is a flow chart illustrating a method of adjusting the gain-brightness graphs shown in FIGS. 2 and 3.

Referring to FIG. 4, the method may include a step S410 of obtaining a reference graph, a step S420 of adjusting a curvature of the reference graph based on a standard deviation, a step S430 of adjusting a gain value of the reference graph in response to an average brightness value, and a step S440 of completing adjusting the reference graph.

In the step S410 of obtaining a reference graph, a graph that may serve as a source of the gain-brightness graphs shown in FIGS. 2 and 3 may be obtained when it is assumed that the gain-brightness graphs shown in FIGS. 2 and 3 may be a final graph, i.e., adjustment-completed ones. In this description, the gain-brightness graph shown in FIG. 3 is taken as the reference graph as an example for clear description.

In the step S420 of adjusting a curvature of the reference graph based on a standard deviation, the curvature of the reference graph shown in FIG. 3 may be adjusted based on the standard deviation of the analogue value stored in the pixel array 10A shown in FIG. 1. For example, the curvature may be greater as the standard deviation becomes greater, and the curvature may be lesser as the standard deviation becomes lesser.

In the step S430 of adjusting a gain value of the reference graph in response to an average brightness value, the maximum gain value of the gain-brightness graph shown in FIG. 3 may be adjusted in response to the average brightness value of the analogue value stored in the pixel array 10A. The minimum gain value instead of the maximum gain value may be adjusted depending on a design.

In the step S440 of completing adjusting the reference graph, the adjustment according to the steps S420 and S430 may be finished.

The signal processing apparatus and method in accordance with the exemplary embodiment of the present invention may acquire the reference graph and adjust the shape of the reference graph in response to the standard deviation and the average brightness value. The reference graph may serve to effectively remove a noise included in a pixel.

Referring back to FIG. 1, the signal processing apparatus in accordance with the exemplary embodiment of the present invention may process data values stored in the plurality of pixels through the analog-digital converting unit 11 and the image processing unit 12. The processing of the data values is performed to obtain clearer image. However, the processing of the data values may darken the image. The noise removing unit 13 of the signal processing apparatus in accordance with the exemplary embodiment of the present invention may adjust a gain value of the whole image by applying a predetermined gain value to the whole image.

Figure 5:
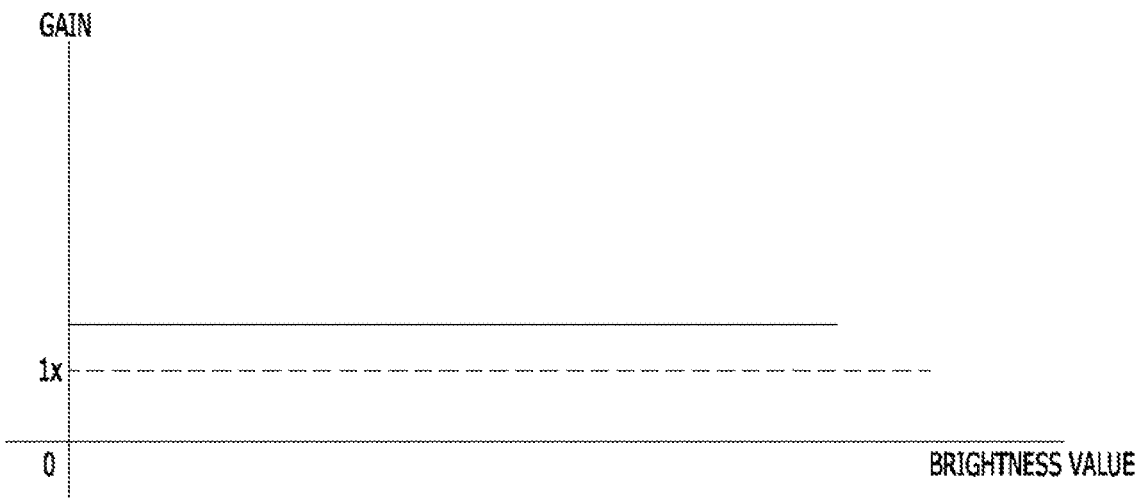
FIG. 5 is a gain-brightness graph illustrating a noise removing unit of the signal processing apparatus shown in FIG. 1.

FIG. 5 is a gain-brightness graph illustrating the noise removing unit 13 of the signal processing apparatus shown in FIG. 1.

Referring to FIGS. 2 and 5, the gain-brightness graph of FIG. 5 may be acquired by moving 'B' of the gain-brightness graph shown in FIG. 2 to 'D'. According to the gain-brightness graph shown in FIG. 5 where the values of "B" and 'D' are identical to each other, a constant gain value may be reflected on data values of all pixels, regardless of the brightness value of the pixels. As described above, the processing of the data values performed by the analog-digital converting unit 11 and the image processing unit 12 of the signal processing apparatus may darken the image. In this case, the noise removing unit 13 may reflect a predetermined and constant gain value on the darkened image according to the gain-brightness graph shown in FIG. 5. The noise removing unit 13 may serve as a gain reflector performing a noise removal as described above.

The signal processing apparatus and method in accordance with the exemplary embodiment of the present invention may brighten the darkened image by applying the predetermined and constant gain value to the darkened image.

Figure 6:
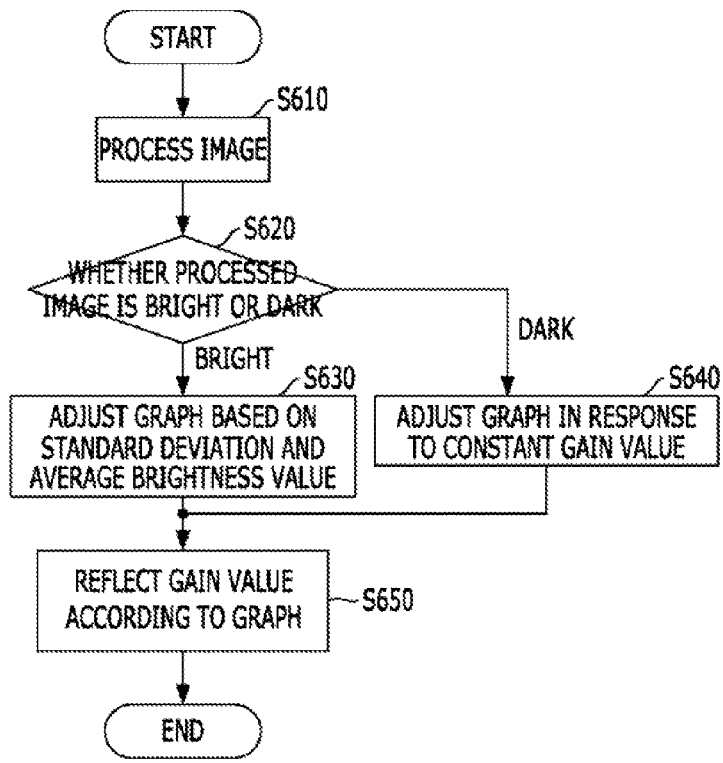
FIG. 6 is a flow chart illustrating a signal processing method in accordance with an exemplary embodiment of the present invention.

FIG. 6 is a flow chart illustrating a signal processing method in accordance with an exemplary embodiment of the present invention.

Referring to FIG. 6, the signal processing method in accordance with the exemplary embodiment of the present invention may include a step S610 of processing an image, a step S620 of determining whether the processed image is bright or dark, a step S630 of adjusting a graph based on a standard deviation and an average brightness value when the processed image is bright, a step S640 of adjusting the graph in response to a constant gain value when the processed image is dark, and a step S650 of reflecting a gain value according to the graph on the processed image.

In the step S610 of processing an image, the analog-digital converting unit 11 and the image processing unit 12 of the signal processing apparatus shown in FIG. 1 may process an image stored in the pixel array 10A.

In the step S620 of determining whether the processed image is bright or dark, the noise removing unit 13 of the signal processing apparatus shown in FIG. 1 may calculate a brightness value of the processed image, and determine whether the processed image is bright or dark based on the calculated brightness value. The image is determined as a dark image when the brightness value of the image is lower than a preset reference and determined as a bright image when the brightness value of the image is greater than the preset reference. In case of the dark image, the step S640 may be performed. In case of the bright image, the step S630 may be performed. The brightness value of the image may be one of the whole images. It is also possible to determine the image as the darkened one when the brightness value of some of the whole images is greater than the preset reference. When the image is divided into several sub-images, each one of the divided sub-images may be independently determined as the brightened one or the darkened one. In such a division case, the method illustrated with reference to FIG. 6 may be performed for each of the divided sub-images.

The step S630 of adjusting a graph based on a standard deviation and an average brightness value when the processed image is bright is described above with reference to FIG. 4. In the graph adjusted by the step S630, the brightness value and the gain value may also have the inverse proportional relationship. To adjust the graph when the processed image is bright, the noise removing unit 13 may obtain a reference graph, and adjust the shape of the reference graph in response to the standard deviation and the average brightness value by the steps S410 to S440.

The step S640 of adjusting the graph in response to a constant gain value when the processed image is dark is described above with reference to FIG. 5. To adjust the graph in response to a constant gain value when the processed image is dark, the noise removing unit 13 may reflect the constant gain value on data values of all pixels in the processed image, regardless of the brightness value of the pixels. A result graph of the step S640 may be the one shown in FIG. 5.

In the step S650 of reflecting the gain value according to the graph on the processed image, the noise removing unit 13 may reflect the gain value according to the graph, which is adjusted by the step S630 or the step S640, on the processed image. The image in which the gain value is reflected may be the final image.

The signal processing method in accordance with the exemplary embodiment of the present invention may obtain and adjust a graph based on the brightness value of the image, and reflect the gain value according to the adjusted graph on the image, thereby obtaining clearer image.

While the present invention has been described with respect to the specific embodiments, it will be apparent to those skilled in the art that various changes and modifications may be made without departing from the spirit and scope of the invention as defined in the following claims.

What is claimed is:

1. A signal processing apparatus comprising:
   a pixel array where a plurality of pixels for storing data values are arranged; and
   a noise removing unit suitable for reflecting a data value of an adjacent pixel and a gain value on a data value of a selected pixel, and outputting a reflected data value of the selected pixel,
   wherein the adjacent pixel is adjacent to the selected pixel, and the gain value depends on a data value of the selected pixel,
   wherein the gain value is determined based on a brightness value of the selected pixel,
   wherein the brightness value and the gain value of the selected pixel are determined by a graph in which the brightness value and the gain value have an inverse proportional relationship, and
   wherein the graph of the inverse proportional relationship has a shape which is adjusted based on an average brightness value and a standard deviation of the data values.

2. The signal processing apparatus of claim 1, further comprising:
   an analog-digital converting unit suitable for digitizing the data values of an analogue value output from the pixel array and outputting a digital signal; and
   an image processing unit suitable for performing a digital image processing on the digital signal output from the analog-digital converting unit.

3. The signal processing apparatus of claim 1, wherein a curvature of the graph is adjusted based on the standard deviation, and a range of the gain value of the graph is adjusted in response to the average brightness value.

4. The signal processing apparatus of claim 1, wherein an average of the data value of the selected pixel and the data value of the adjacent pixel is reflected on the reflected data value output by the noise removing unit.

5. The signal processing apparatus of claim 1, wherein the graph of the inverse proportional relationship includes a continuous function.

6. A signal processing method comprising:
   processing an image of a pixel array where a plurality of pixels for storing data values are arranged;
   determining whether the processed image is bright or dark;
   adjusting a graph based on the determination result; and
   reflecting a gain value of the adjusted graph on the processed image,
   wherein the data value includes a brightness value of a pixel in the plurality of pixels, and
   wherein the adjusting a graph based on the determination result includes:
      adjusting a curvature and a gain value of a first graph based on a standard deviation and an average brightness value of the data values when the processed image is bright; and
      adjusting a gain value of a second graph in response to a predetermined gain value when the processed image is dark.

7. The method of claim 6, wherein the determining whether the processed image is bright or dark includes:
   calculating the brightness value of the processed image; and
   determining whether the processed image is bright or dark based on the calculated brightness value.

8. The method of claim 6, wherein the first graph is defined by an inverse proportional relationship between the brightness value and the gain value of the pixel, and has a shape, which is adjusted based on the standard deviation and the average brightness value.

9. The method of claim 6, wherein a curvature of the first graph is adjusted based on the standard deviation, and a range of a gain value of the first graph is adjusted in response to the average brightness value.

10. The method of claim 6, wherein the second graph is defined by a constant value regardless of the brightness value of the pixel.

11. The method of claim 6, wherein the processing an image includes:
    analog-digital converting the data values of an analogue value of the image to output digital signals; and
    image processing the digital signals.

12. The method of claim 6, further comprising:
    reflecting an average of the data value of the pixel and a data value of adjacent pixels, on the pixel.

* * * * *